(12) United States Patent
Wagner et al.

(10) Patent No.: US 12,516,925 B2
(45) Date of Patent: Jan. 6, 2026

(54) RADIUS OF CURVATURE (ROC) DETERMINATIONS BASED ON ROC-DEPENDENT OPTICAL CONJUGATE POSITIONS

(71) Applicant: VIAVI SOLUTIONS INC., Chandler, AZ (US)

(72) Inventors: Christopher Russell Wagner, Kanata (CA); Joshua Benjamin Julius Philipson, Ottawa (CA); Nicklos Joseph Bulitka, Stittsville (CA); Kevin Cassady, Monroe, WA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 217 days.

(21) Appl. No.: 18/530,068

(22) Filed: Dec. 5, 2023

(65) Prior Publication Data

US 2025/0180348 A1 Jun. 5, 2025

(51) Int. Cl.
*G01B 11/255* (2006.01)
*G03B 13/20* (2021.01)
*G03B 13/36* (2021.01)

(52) U.S. Cl.
CPC ............ *G01B 11/255* (2013.01); *G03B 13/20* (2013.01); *G03B 13/36* (2013.01)

(58) Field of Classification Search
CPC .... G01B 11/2441; G01B 11/303; G01B 9/02; G01B 9/0203; G01B 9/021;
(Continued)

(56) References Cited

U.S. PATENT DOCUMENTS

| | | | | |
|---|---|---|---|---|
| 4,523,849 | A | * | 6/1985 | Stone ..................... G02B 27/28 359/488.01 |
| 5,106,183 | A | * | 4/1992 | Yoder, Jr. ............. G01B 11/255 351/212 |

(Continued)

FOREIGN PATENT DOCUMENTS

| | | | | |
|---|---|---|---|---|
| CN | 106687793 A | * | 5/2017 | ............. G02B 6/385 |
| EP | 0317768 A1 | * | 5/1989 | ........... G01B 11/255 |

OTHER PUBLICATIONS

"3 Tests to Ensure Endface Clarity & Geometry". (accessed May 1, 2023), 9 pages.(https://www.cbo-it.de/en/blog/3-tests-to-ensure-endface-clarity-geometry.html).
(Continued)

*Primary Examiner* — Michael P Stafira
(74) *Attorney, Agent, or Firm* — Mannava & Kang, P.C.

(57) ABSTRACT

According to examples, a system for determining a ROC of a DUT may include an illumination source to output a light beam, an imager to capture images, and optical components positioned in an illumination path from the illumination source to a DUT location and in an imaging path from the DUT location to the imager, in which at least one of the optical components includes a fiducial mark. The system may also include a controller to cause a relative position between the DUT location and a lens in the optical components to vary and cause conjugate images of the fiducial mark to be relayed through the optical components to the imager and determine the ROC of the DUT based on an application of a correlation of ROC-dependent optical conjugate positions in the optical components induced by the ROC of the DUT.

20 Claims, 5 Drawing Sheets

(58) Field of Classification Search
CPC ............ G01B 9/02044; G01B 9/02063; G01B 9/02091; G01B 11/00; G01B 11/24; G01B 11/272; G01B 9/0205; G01B 9/02056; G01B 9/02057; G01B 11/14; G01B 11/255; G01B 9/02049; G01B 9/02087; G01B 9/04; G02B 6/385; G02B 21/0016; G02B 6/3866; G02B 6/3825; G02B 6/3885; G02B 6/381; G02B 21/0008; G02B 6/3849; G02B 6/3807; G02B 6/3853; G02B 6/3882; G02B 6/4457; G02B 6/4459; G02B 21/365; G02B 6/3833; G02B 21/0004; G02B 6/3897; G02B 6/4292; G02B 6/32; G02B 6/3879; G02B 6/4442; G02B 21/06; G02B 6/3822; G02B 6/3843; G02B 21/361; G02B 6/52; G02B 6/25; G02B 6/3624; G02B 6/3887; G02B 6/423; G02B 23/2446; G02B 6/3829; G02B 6/3831; G02B 6/3863; G02B 6/3874; G02B 6/3893; G02B 6/4225; G02B 6/44528; G02B 6/4453; G02B 6/0006; G02B 6/3628; G02B 6/3636; G02B 6/3878; G02B 6/3898; G02B 21/02; G02B 6/3821; G02B 6/4428; G02B 21/0032; G02B 6/241; G02B 6/3652; G02B 6/3869; G02B 6/4296; G02B 6/444; G02B 6/4447; G02B 7/003; G02B 7/1822; G02B 21/002; G02B 27/141; G02B 6/255; G02B 6/2553; G02B 6/2555; G02B 6/3608; G02B 6/383; G02B 6/3881; G02B 6/3888; G02B 6/3895; G02B 6/4284; G02B 6/44526; G02B 6/4455; G02B 6/44715; G02B 6/46; G02B 21/00; G02B 21/244; G02B 21/362; G02B 23/2423; G02B 27/0006; G02B 6/352; G02B 6/353; G02B 6/3672; G02B 6/38; G02B 6/3826; G02B 6/3835; G02B 6/3838; G02B 6/3839; G02B 6/3847; G02B 6/3851; G02B 6/3865; G02B 6/387; G02B 6/3875; G02B 6/38875; G02B 6/403; G02B 6/4221; G02B 6/4246; G02B 6/4454; G02B 6/562; G02B 13/0095; G02B 2006/4297; G02B 21/10; G02B 21/367; G02B 23/2461; G02B 25/002; G02B 26/0816; G02B 27/14; G02B 5/0278; G02B 6/02033; G02B 6/2551; G02B 6/2558; G02B 6/325; G02B 6/3805; G02B 6/3806; G02B 6/3809; G02B 6/3823; G02B 6/3846; G02B 6/3857; G02B 6/3861; G02B 6/389; G02B 6/4204; G02B 6/4405; G02B 6/44265; G02B 6/475; G02B 6/477; G02B 7/1825
See application file for complete search history.

(56) References Cited

U.S. PATENT DOCUMENTS

| | | | | |
|---|---|---|---|---|
| 7,356,236 | B1* | 4/2008 | Huang | G02B 6/385 385/134 |
| 9,612,177 | B2* | 4/2017 | Clarke | G01M 11/33 |
| 2010/0091298 | A1* | 4/2010 | Franz | G01B 11/255 356/124 |
| 2016/0150952 | A1* | 6/2016 | Raymond | A61B 3/1015 351/205 |

OTHER PUBLICATIONS

"Fiber Optic Terminus End Face Quality Standards", downloaded from the Internet on Dec. 4, 2023, 12 pages. http://www.fibersystems.com/pdf/whitepapers/Quality-Standards.pdf.
"Simplex and Duplex Fiber-Optic Cable," Fiber Savvy. (accessed May 1, 2023), 5 pages.( https://www.fibersavvy.com/blogs/news/simplex-and-duplex-fiber-optic-cable).
Data-Pixel, "DAISI-V3, Digital Automated Interferometer and Microscope for Surface Inspection", Downloaded from the Internet on Dec. 4, 2023, 4 pages.(https://www.data-pixel.com/product/daisi-v3/).
Fibrain, "Parametry-geometryczne-czola-ferruli_en.pdf." https://fibrain.pl/wp-content/uploads/2021/04/Parametry-geometryczne-czola-ferruli_en.pdf (accessed May 1, 2023), 3 pages.
https://www.youtube.com/watch?v=m-SobTqJBfk&t=70s (Using the PSM for alignment), Downloaded from the Internet on Dec. 5, 2023, 2 pages.
Promet, "FiBO 300 Interferometer", downloaded from the Internet on Dec. 4, 2023.https://www.prometoptics.com/products/fibo-300/.
T. J. Drapela, "Optical fiber connectors: an interlaboratory comparison of measurements of endface geometry", Apr. 1, 1998, 2 pages.(https://www.nist.gov/publications/optical-fiber-connectors-interlaboratory-comparison-measurements-endface-geometry).
Thorlabs, "Fiber End Face Interferometer", downloaded from the Internet on Dec. 4, 2023, 4 pages.(https://www.thorlabs.com/newgrouppage9.cfm?objectgroup_ID=12195).
Y. Xu, L. Chen, R. Zhu, and G. Yao, "Algorithm study of the measurement of the radius of curvature of fiber optic connector end faces," in Optical Design and Testing II, SPIE, Feb. 2005, pp. 444-450. DOI: 10.1117/12.576665.

* cited by examiner

500

┌─────────────────────────────────────┐
│ CAUSE A RELATIVE POSITION BETWEEN A DUT │
│ LOCATION AT WHICH A DUT IS POSITIONED AND A │
│ LENS TO VARY │
│ 502 │
└─────────────────────────────────────┘
                  ↓
┌─────────────────────────────────────┐
│ DETERMINE A POSITION OF THE DUT LOCATION AT │
│ WHICH A CONJUGATE IMAGE OF A FIDUCIAL MARK │
│ CAPTURED BY AN IMAGER IS IN FOCUS │
│ 504 │
└─────────────────────────────────────┘
                  ↓
┌─────────────────────────────────────┐
│ DETERMINE THE ROC OF THE DUT BASED ON AN │
│ APPLICATION OF A CORRELATION OF ROC- │
│ DEPENDENT OPTICAL CONJUGATE POSITIONS IN │
│ THE OPTICAL COMPONENTS INDUCED BY THE ROC │
│ OF THE DUT FROM THE DETERMINED POSITION OF │
│ THE DUT LOCATION │
│ 506 │
└─────────────────────────────────────┘

*FIG. 5*

RADIUS OF CURVATURE (ROC) DETERMINATIONS BASED ON ROC-DEPENDENT OPTICAL CONJUGATE POSITIONS

TECHNICAL FIELD

The disclosure relates generally to inspection of fiber-optic terminating connectors. Particularly, the disclosure relates to end-face geometry inspection of fiber-optic terminating connectors and more particularly to determination of a radius of curvature (ROC) of a fiber-optic terminating connector based on an application of a correlation of ROC-dependent optical conjugate positions in optical components induced by the ROC of the connector.

BACKGROUND

Optical fibers are often used to communicate telecommunication signals between sources and destinations because the optical fibers enable relatively high data transmissions rates and bandwidth. Optical fibers also experience relatively low signal loss (attenuation) over long distances, which enables telecommunication signals to travel over long distances oftentimes without requiring the need for frequent signal amplification. The ends of optical fibers, e.g., connectors, are often capped with ferrules to enable coupling of the optical fibers with various types of equipment.

BRIEF DESCRIPTION OF THE DRAWINGS

Features of the present disclosure may be illustrated by way of example and not limited in the following figure(s), in which like numerals indicate like elements, in which:

FIG. 5 illustrates a flow diagram of a method for determining a ROC of a DUT, according to an example of the present disclosure.

DETAILED DESCRIPTION

Figure 1:
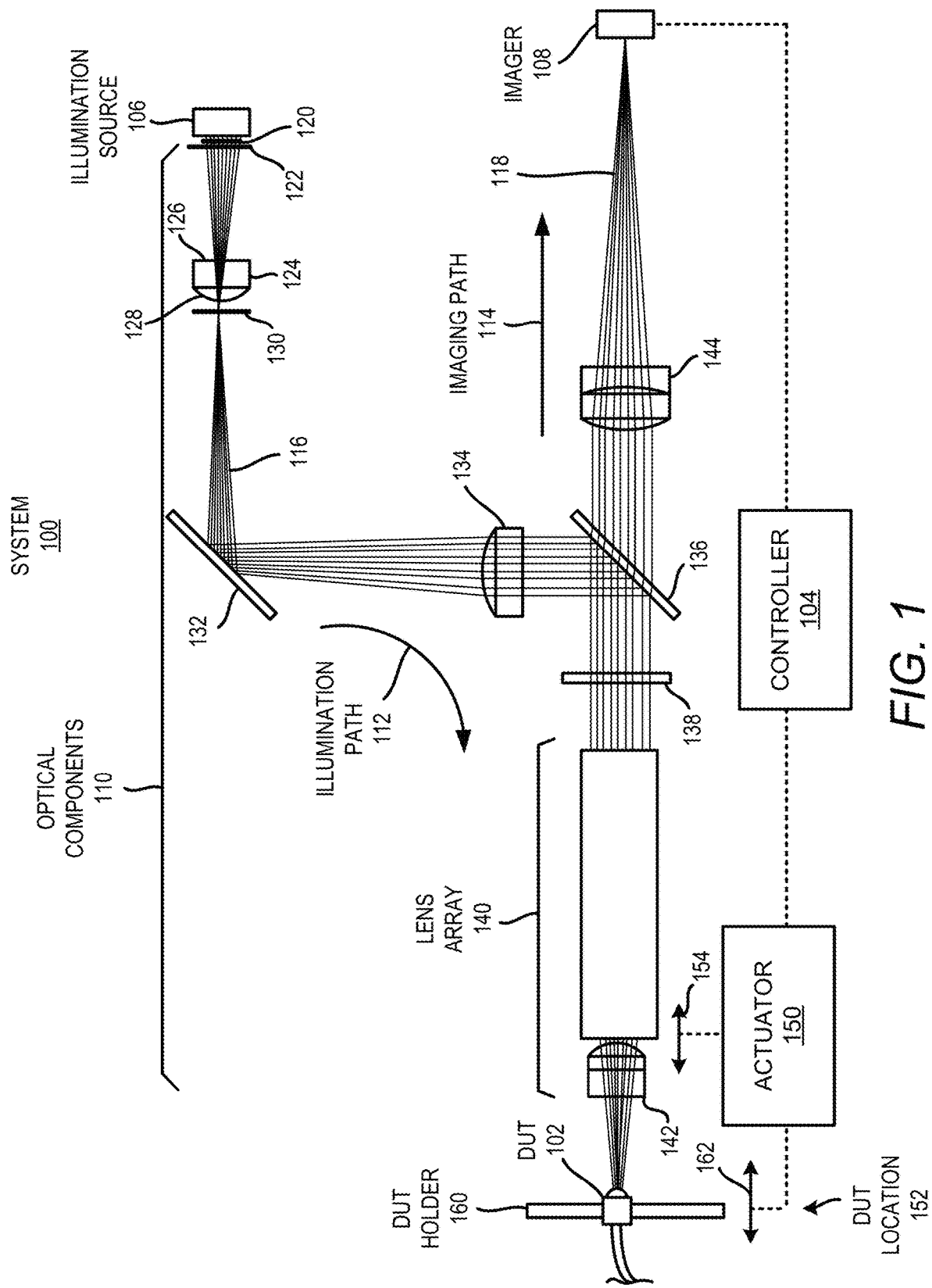
FIG. 1 illustrates a system for capturing images of a device under test (DUT) and for analyzing the captured images, according to an example of the present disclosure.

In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the description of the present disclosure. Also, for simplicity and illustrative purposes, the present disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

The end-faces of ferrules in fiber-optic cables, e.g., the terminating connectors of fiber-optic cables, are typically domed to insure that the contact area between mating connectors is at the center of the ferrule where the fiber core is located. The radius of this dome is called the "radius of curvature" (ROC) of the fiber-optic cable terminating connector. The ROC for a given ceramic simplex optic fiber DUT may vary from around 0 mm to around 25 mm. A connector with a 0 mm ROC is flat-polished connector and a DUT with ROC ranging between 10 mm to 25 mm may typically be categorized as a polished connector (PC). If the ROC is relatively small value (≥0 mm), there will be a smaller contact area, which may exert more force on the fiber apex point during mating of the fiber-optic cable. If the radius of curvature is a higher value, physical contact between mating fibers may not be achieved because there will be a larger contact area, which may result in less ferrule deformation. As a result, the radius of curvature of the ferrule may affect the transmission and reflection properties of the fiber-optic cables. For instance, improper physical contact may result in insertion loss and back reflection.

Interferometric microscopes are typically used to measure ferrule geometries. In an interferometric measurement, the relative height/depth of each point on the 3D ferrule/fiber end-face is determined from an interferogram. Some devices are based on contact interferometers, which are based on Fabry-Perot designs, in which the high point (apex point) of the ferrule end-face must be in contact with a glass reference flat in the instrument. Other devices are based on non-contact interferometers, such as variations of the Michelson interferometer. Issues associated with the use of interferometric microscopes are that they are relatively expensive and may be relatively complicated for a user to operate.

Disclosed herein are systems for determining a ROC of a device under test (DUT), e.g., a terminating connector of a fiber-optic cable, through application of a correlation of ROC-dependent optical conjugate positions induced by the ROC of the DUT. Particularly, a system may include a controller that may determine the ROC of the DUT based on a correlation between a position of the DUT and a conjugate image of a fiducial mark on an optical component being in focus on an imager.

More particularly, and as discussed in greater detail herein, an illumination source may apply a light beam through optical components and onto a DUT at a DUT location. The illumination of the DUT may cause a conjugate image of an object (such as a mark on a diffuser, a mirror, a collimator, or the like) induced by the ROC of the DUT to be conveyed through the optical components and onto an imager. The distance at which the DUT is positioned with respect to, for instance, an objective lens of the optical components, and the ROC of the DUT may vary a focus level of the conjugate image of the object on the imager.

As discussed herein, by varying the distance between the DUT and the objective lens of the optical components, a position at which the DUT causes the conjugate image of the object to be focused on the imager may be determined. According to examples, the controller may determine an ROC of the DUT that corresponds to the determined distance of the DUT at which the conjugate image of the object is caused to be in focus on the imager. For instance, the controller may access a set of data that includes correlations between ROCs and distances between the DUT and the lens at which the conjugate image is in focus on or of the imager. The set of data may be in the form of a lookup table that the controller may access to make the ROC determination and the controller may determine the ROC through an interpolation of the information contained in the set of data.

Through implementation of the features of the present disclosure, the ROC of a DUT, e.g., a terminating connector of a fiber-optic cable, may be determined in a relatively simple and inexpensive manner. That is, the ROC of the DUT may be determined without requiring the use of an interferometer. Instead, the ROC of the DUT may be determined through use of an optical system that may already be available for use in examining other aspects of the DUT. The optical system may be a microscope, for instance. A technical improvement afforded through use of the present disclosure may thus be that additional equipment and expertise may not be required to determine the ROC of the DUT.

With reference first to FIG. 1, there is illustrated a system 100 for capturing images of a device under test (DUT) 102 and for analyzing the captured images, according to an example of the present disclosure. For instance, the system 100 may include a controller 104 that may determine an end-face geometry, e.g., a radius of curvature, of the DUT 102. It should be understood that the system 100 may include additional features and that some of the features described herein may be removed and/or modified without departing from the scopes of the system 100.

As shown, the system 100 may include an illumination source 106 and an imager 108. The system 100 may also include optical components 110 positioned between the illumination source 106 and the imager 108. The optical components 110 may be positioned to direct light rays emitted from the illumination source 106 toward the DUT 102 along an illumination path 112 and light rays reflected from the DUT 102 to the imager along an imaging path 114. The light rays emitted from the illumination source 106 are denoted with reference numeral 116 and the light rays reflected from the DUT 102 are denoted with reference numeral 118. According to examples, the system 100 may include a microscope or other type of optical imaging device.

The illumination source 106 may be any suitable type of illumination device for an optical system, such as a light emitting diode (LED), an incandescent lamp (such as a tungsten lamp), a halogen lamp, an arc lamp, and/or the like. The illumination source 106 may emit light rays 116 toward the optical components 110 along the illumination path 112. Particularly, the optical components 110 along the illumination path 112 may include a diffuser 120, which may scatter light emitted therethrough to make the light softer and spread out uniformly over an area. The optical components 110 along the illumination path 112 may also include an aperture stop (AS) 122, which may limit the marginal limiting rays through the system 100. The optical components 110 along the illumination path 112 may further include a collector (or collector lens) 124, which may include a planar side 126 and a spherical side 128. The collector 124 may concentrate the light rays 116 that pass through a field stop 130, which may limit the field of view of the optical system 100.

The light rays 116 may be directed to an illumination fold mirror 132 that may reflect and redirect the light rays 116 to a field lens (FIE) 134, which may shape and direct light onto the DUT 102, e.g., may present the image of the illumination source to a lens array 140. The FIE 134 may enhance the light rays 116, which are directed onto a beam splitter 136, which may reflect and redirect the light rays toward a window 138 and the lens array 140. The lens array 140 may also be termed an objective lens 140 and may include a microscope objective lens 142. The lens array 140 may include a number of lenses that may focus the light rays 116 onto a surface of the DUT 102. Some of the light rays 118 that are reflected from the surface of the DUT 102 may be directed back toward the lens array 140 and through the window 138. Additionally, the beam splitter 136 may allow the light rays 118 along the imaging path 114 to pass through the beam splitter 136 as shown in FIG. 1. The light rays 118 may also pass through a tube lens (TL) 144, which may focus the light rays 118 onto the imager 108.

The imager 108 may be an electronic device, e.g., a sensor, that may convert incoming light into digital signals. The imager 108 may communicate the digital signals to the controller 104, which may process the digital signals to generate digital images. According to examples, the system 100 may include an actuator 150 that the controller 104 may control, in which the actuator 150 may move the relative position of the lens array 140, and particularly, the microscope objective lens 142, with respect to a DUT location 152. The DUT location 152 may be a location at which the DUT 102 is positioned during performance of an imaging operation on the DUT 102. The controller 104 may cause the actuator 150 to change the relative position of the lens array 140 with respect to the DUT location 152 as denoted by the arrow 154 to vary the focus on and thus, the quality of the captured image of the DUT 102. For instance, the controller 104 may perform an autofocus operation using the actuator 150 to obtain a clear image of the DUT 102.

In addition, or alternatively, the actuator 150 may be connected to or may otherwise move a DUT holder 160, which may include an opening into which a DUT 102 may be inserted and held during testing of the DUT 102. In these examples, the controller 104 may control the actuator 150 to move the DUT holder 160 and thus, the DUT location 152, as denoted by the arrow 162. Again, the controller 104 may cause the actuator 150 to move the DUT holder 160 such that the DUT 102 may be in focus and a clear image of the DUT 102 may be captured for analysis.

Figure 2:
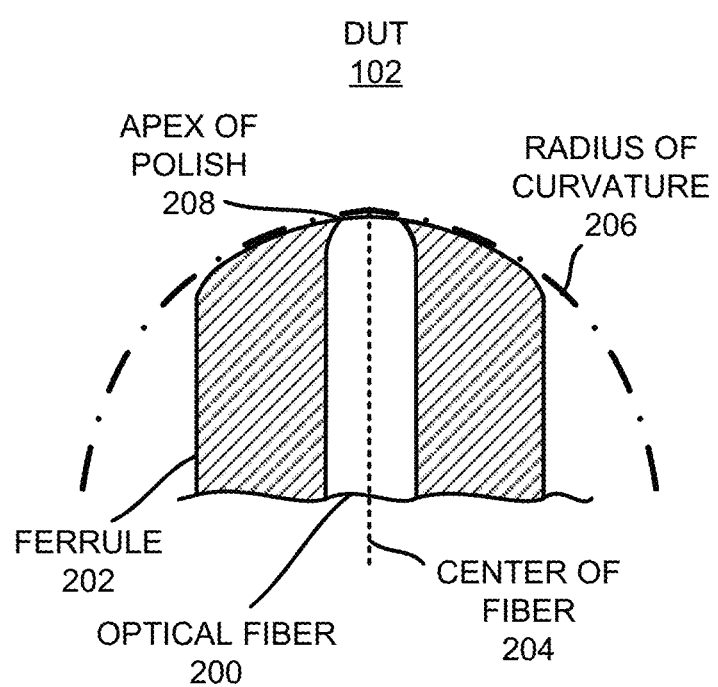
FIG. 2 illustrates a cross-sectional view of a device under test (DUT) that has a curved surface, e.g., the DUT depicted in FIG. 1, according to an example of the present disclosure.

Turning now to FIG. 2, there is shown a cross-sectional view of a DUT 102 that has a curved surface, e.g., the DUT depicted in FIG. 1, according to an example of the present disclosure. In some examples, the DUT 102 may be a fiber-optic cable connector, which may include an optical fiber 200 and a ferrule 202, in which the optical fiber 200 extends through the ferrule 202. In some examples, the optical fiber 200 may extend through a center of the ferrule 202 such that a center 204 of the optical fiber 200 may be aligned with a center of the ferrule 202. As the DUT 102 may have a curved surface, the DUT 102 may have a radius of curvature (ROC) 206 and an apex of polish 208. In FIG. 2, the DUT 102 is depicted as having a spherical ROC 206. In other instances, the DUT 102 may have a flatter curvature, a greater curvature, an offset apex (in which the apex of the DUT 102 is off-center), a fiber undercut (fiber tip is lower than the ferrule 202), fiber overcut (fiber is higher than the ferrule 202), and/or the like.

According to examples, the controller 104 may determine the ROC 206 of the DUT 102 based on an application of a correlation of ROC-dependent optical conjugate positions in the optical components 110 induced by the ROC 206 of the DUT 102. In other words, the controller 104 may use a conjugate position at a specified location within the system 100 to determine the ROC 206 of the DUT 102. Stated another way, there may be a position of the DUT 102 with respect to the lens array 140 that may cause a conjugate position within the system 100 to come into focus of the imager 108 and that conjugate position may vary depending upon the ROC 206 of the DUT 102.

The DUT 102 position (or distance between DUT 102 and the microscope objective lens 142) at which the conjugate position is in focus of the imager 108 occurs may be correlated to the ROC 206 of the DUT 102. The controller 104 may determine the ROC 206 of the DUT 102 by determining the position of the DUT 102 with respect to the microscope objective lens 142 when the conjugate position is in focus. Particularly, the controller 104 may access a data store or, more generally, a set of data, that includes correlations between a plurality of ROCs and a plurality of DUT 102 positions or distances between the DUT 102 and the microscope objective lens 142 at which the conjugate position is in focus to determine the ROC 206 of the DUT 102. The correlations may be determined during or shortly after manufacture of the DUT 102. It should be understood that references made herein to the position of the DUT 102 location with respect to the microscope objective lens 142 may equivalently be construed as an actual location of the DUT 102, which may be determined, for instance, through use of an encoder. In addition, the position of the DUT 102 may be used to determine the ROC 206 of the DUT 102 in manners similar to those described herein to determine the ROC 206 using the relative position of the DUT 102 with respect to the microscope objective lens 142.

Generally speaking, the optical components 110 may include multiple conjugate positions or conjugate planes, which refer to the concept of planes that have internal intermediate images. In other words, the optical components 110 may construct more than one image, e.g., images may be relayed multiple times through the optical components 110, and each plane that has such an internal image is considered conjugated to the object. Conjugate planes may be defined as planes in the optical components 110 that have object-image relationships with the object. In other words, conjugates of an optical system may be defined as the object presented to the optical components 110, and the image that is produced, i.e., conjugates of the optical components 110 may be the object presented to the lensing system and the image that is produced.

As a result, any object that occludes (dust), colors, partially-transmits (e.g., a scratch) at one intermediate image plane in the optical components 110 will be overlapped at every subsequent imaging conjugate plane in the optical components 110. In addition, the image created by one optical component may serve as the object for another optical component as the image is relayed through the optical components, which means that an object may repeatedly be imaged and any plane that creates such an intermediate image all have the conjugate-relationship. Thus, for instance, an object, e.g., a fiducial mark, on one of the optical components 110 may have conjugate images on other ones of the optical components 110 as well as the imager 108. The focus level of the conjugate image of the object on the imager 108 may be dependent on the position of the DUT 102 and the ROC 206 of the DUT 102. As a result, the focus level of the conjugate image of the object on the imager 108 may be changed by changing the relative position of the DUT 102 and a lens of the optical components 110.

According to examples, the controller 104 may cause the DUT 102 to be scanned forward and backwards with respect to the microscope objective lens 142, which may cause focus levels of the conjugate images on the imager 108 to change. In other words, movement of the conjugate locations may cause internal conjugate surfaces to come into and out of focus on the imager 108. By measuring and noting the DUT 102 locations where the one or more internal conjugate surfaces come into focus, the controller 104 may infer the ROC 206 of the DUT 102. For instance, a fiducial mark (not shown) may be provided on one of the optical components 110, and the controller 104 may determine at which position of the DUT 102 with respect to the microscope objective lens 142 a conjugate image of the fiducial mark comes into focus of the imager 108. The controller 104 may determine the ROC 206 of the DUT 102 based on that determined position.

The fiducial mark may be any type of mark, which the imager 108 may capture an image of, and the controller 104 may identify. For instance, the fiducial mark may be a symbol, a cross-hair, a scratch, a letter, a character, and/or the like. In any of these examples, the fiducial mark may be relatively small and positioned such that the fiducial mark does not significantly affect other optical operations of the optical components 110. The fiducial mark may be printed onto an optical component 110, etched into the optical component 110, laser engraved into the optical component 110, or the like.

Figure 3:
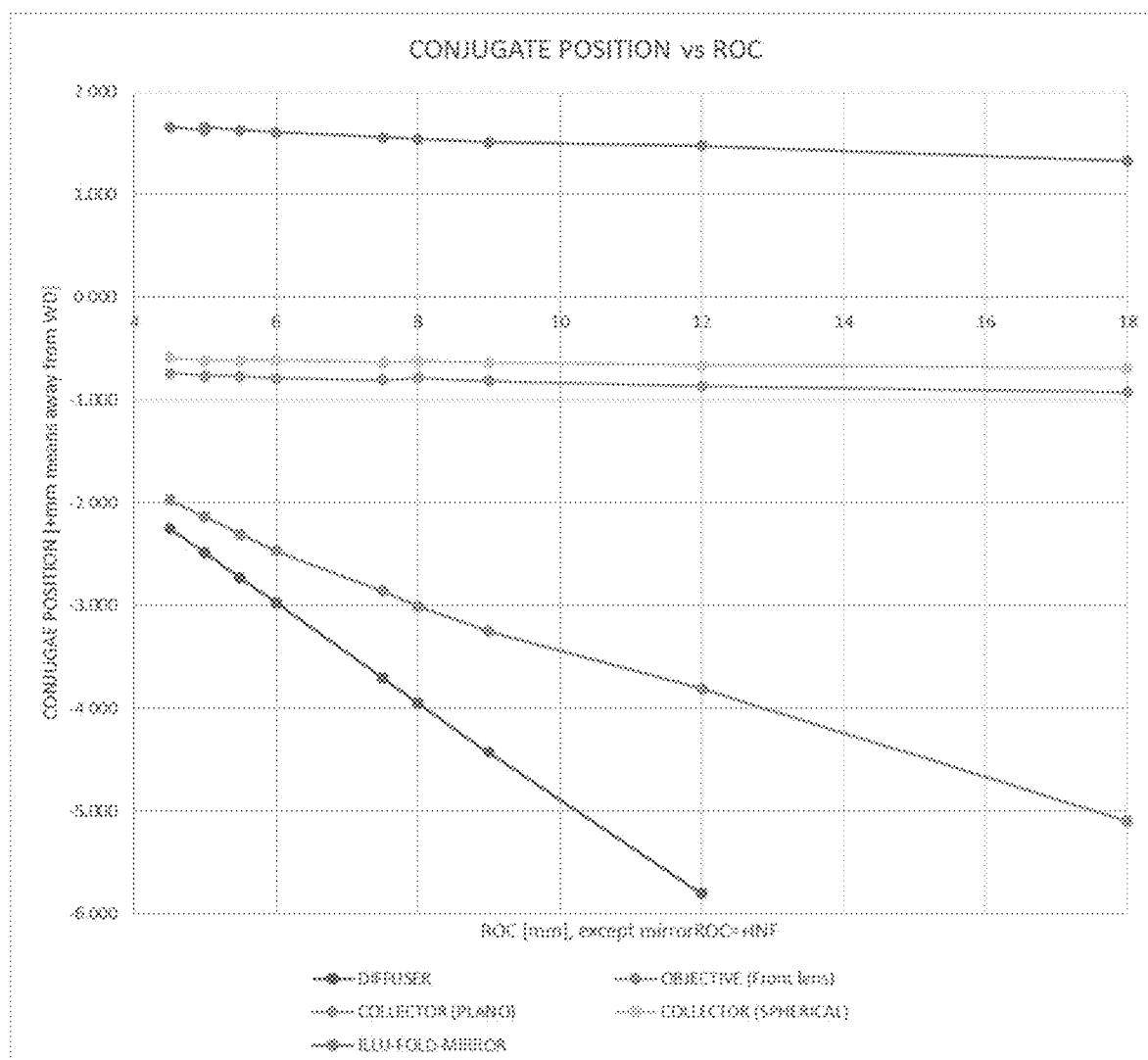
FIG. 3 illustrates a graph of conjugate positions vs radius of curvatures (ROCs) for some of the optical components shown in FIG. 1, in accordance with an example of the present disclosure.

The conjugate positions in the optical components 110 may have varying levels of sensitivities to different ROCs 206 of the DUTs 102. An example of conjugate positions vs ROCs for some of the optical components 110 in the optical system 100 is depicted in the graph 300 shown in FIG. 3. In FIG. 3, the X axis refers to the ROC 206 of a DUT 102 and the Y axis refers to the conjugate positions corresponding to the working distance (WD) between the microscope objective lens 142 and the DUT 102. The WD may correspond to when the objective is in focus on the DUT 102. It should be understood that the graph 300 is presented for illustrative purposes and should thus not be construed as limiting the present disclosure in any respect.

As shown in FIG. 3, the conjugate positions at the diffuser 120 may differ greatly for different ROCs, while the conjugate positions at the spherical plane (COL-SPH) 128 of the collector 124 may have a lesser degree of change for the different ROCs. As a result, the conjugate positions at the diffuser 120 may be more sensitive to different ROCs 206 than the conjugate positions at the spherical plane 128 of the collector 124. Similarly, the conjugate positions at the planar side (COL-PLANO) 126 of the collector 124 may have a similar sensitivity to the ROCs as the conjugate positions at the spherical plane 128 of the collector 124. In some examples, as the level of movement between the DUT location 152 and the microscope objective lens 142 may be capped, an optical component having a sensitivity level within the maximum level of movement may be selected for receipt of the fiducial mark. In other examples, the optical component on which the fiducial mark may be placed may be selected based on other considerations, such as a level of disruption to imaging operations, ease of placement, etc.

The correlations between the conjugate positions, e.g., the conjugate positions resulting from the position of the DUT 102 with respect to the microscope objective lens 142, and the ROCs may be determined through testing of various ROCs and DUT 102 positions. In addition, a set of data including the correlations between the ROCs, the DUT 102 positions, and the conjugate positions may be determined from the testing and may be stored. As discussed herein, the controller 104 may use the set of data to determine the ROC 206 of a DUT 102, through, for instance, interpolation of the correlations between the conjugate positions and the ROCs from the set of data. The set of data may also be in the form of a lookup table that the controller 104 may access to make this determination.

Figure 4:
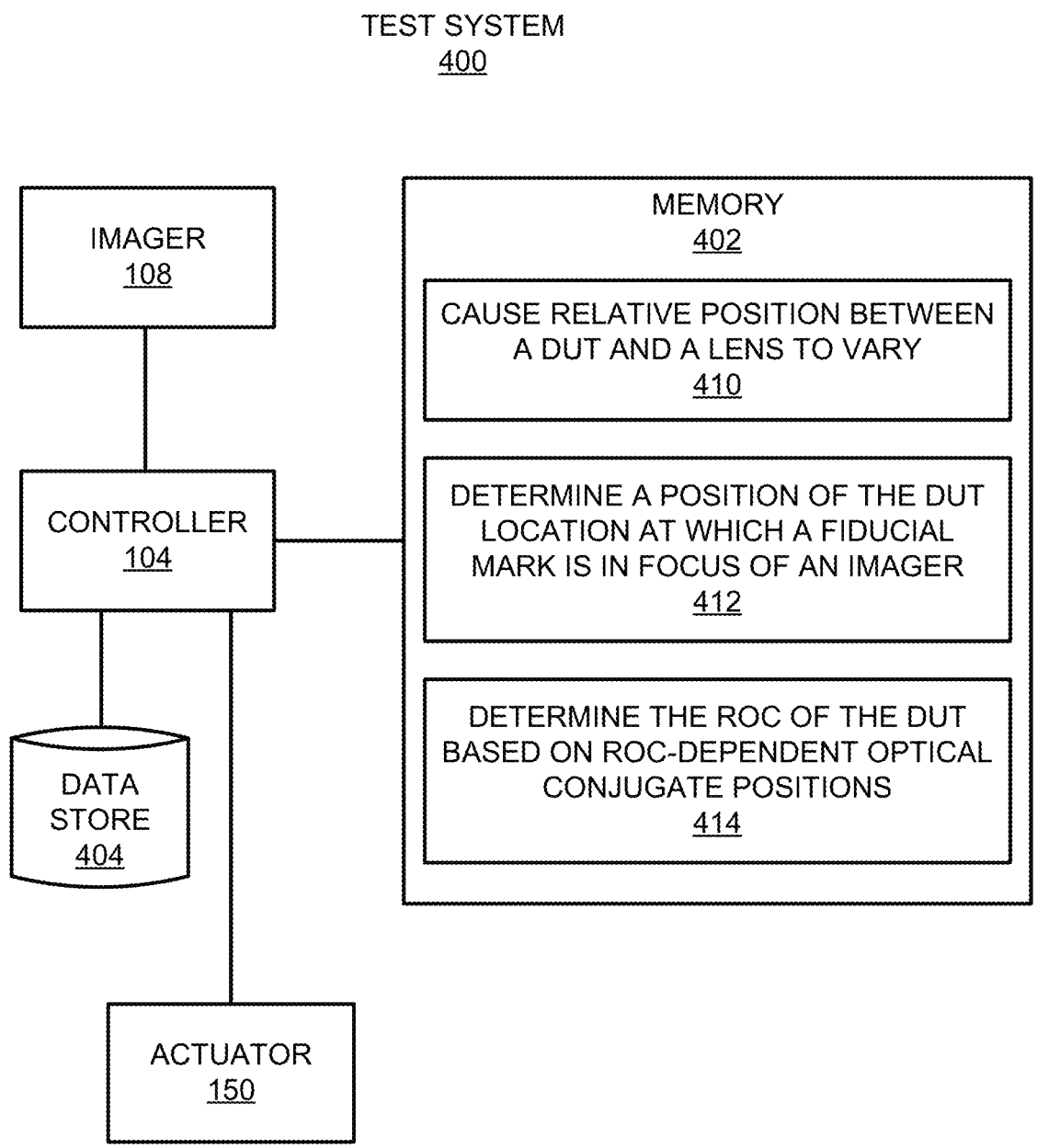
FIG. 4 is a block diagram of a test system for determining a ROC of a DUT, in accordance with an example of the present disclosure.

FIG. 4 shows a block diagram of a test system 400 for determining a ROC 206 of a DUT 102, in accordance with an example of the present disclosure. It should be understood that the test system 400 may include additional elements and that some of the elements described herein may be removed and/or modified without departing from a scope of the test system 400. The description of the test system 400 is made with reference to the features shown in FIGS. 1 and 2 for purposes of illustration and not of limitation.

As shown in FIG. 4, the test system 400 may include the controller 104, the imager 108, and the actuator 150 depicted in FIG. 1. The test system 400 may also include a memory 402 on which instructions that the controller 104 may access and/or execute are stored. In addition, the test system 400 may include a data store 404 on which the controller 104 may store various information. In some examples, the controller 104, the memory 402, and the data store 404 may be components of a computing device, such as a laptop computer, a server computer, a desktop computer, a tablet computer, and/or the like. In other examples, the controller 104, the memory 402, and the data store 404 may be components of the system 100 depicted in FIG. 1.

The controller 104 may be a semiconductor-based microprocessor, a central processing unit (CPU), an application specific integrated circuit (ASIC), a field-programmable gate array (FPGA), and/or other hardware device. The memory 402, which may also be termed a computer readable medium, is, for example, a Random Access memory (RAM), an Electrically Erasable Programmable Read-Only Memory (EEPROM), a storage device, or the like. In some examples, the memory 402 is a non-transitory computer readable storage medium, where the term "non-transitory" does not encompass transitory propagating signals. In any regard, the memory 402 has stored thereon machine-readable instructions that the controller 104 executes. The data store 404 may also be a Random Access memory (RAM), an Electrically Erasable Programmable Read-Only Memory (EEPROM), a storage device, or the like.

Although the test system 400 is depicted as having a single controller 104, it should be understood that the test system 400 may include additional processors and/or cores without departing from a scope of the test system 400. In this regard, references to a single controller 104 as well as to a single memory 402 may be understood to additionally or alternatively pertain to multiple controller 104 and/or multiple memories 402. In addition, or alternatively, the controller 104 and the memory 402 may be integrated into a single component, e.g., an integrated circuit on which both the controller 104 and the memory 402 may be provided. In addition, or alternatively, the operations described herein as being performed by the controller 104 are distributed across multiple test systems 400 and/or multiple controllers 104.

As shown in FIG. 4, the memory 402 has stored thereon machine-readable instructions 410-414 that the controller 104 is to execute. Although the instructions 410-414 are described herein as being stored on the memory 402 and thus include a set of machine-readable instructions, the test system 400 may include hardware logic blocks that may perform functions similar to the instructions 410-414. For instance, the controller 104 may include hardware components that may execute the instructions 410-414. In other examples, the test system 400 may include a combination of instructions and hardware logic blocks to implement or execute functions corresponding to the instructions 410-414. In any of these examples, the controller 104 may implement the hardware logic blocks and/or execute the instructions 410-414. As discussed herein, the test system 400 may also include additional instructions and/or hardware logic blocks such that the controller 104 may execute operations in addition to or in place of those discussed above with respect to FIG. 4.

The controller 104 is to execute the instructions 410 to cause a relative position between a DUT location 152 at which the DUT 102 is positioned and a microscope objective lens 142 of optical components 110 to vary. As discussed herein, varying the relative position between the DUT location 152 and the microscope objective lens 142 may cause conjugate images of a fiducial mark positioned on one of the optical components 110 to be relayed through the optical components 110 and from the DUT 102 to an imager 108 at varying levels of focus. Thus, there may be a relative position of the DUT 102 at which the fiducial mark may be in focus of the imager 108.

The controller 104 is to execute the instructions 412 to determine a position of the DUT location 152 with respect to the microscope objective lens 142 at which a conjugate image of the fiducial mark captured by the imager 108 is in focus of the imager 108. In other words, the controller 104 may cause the respective position between the DUT location 152 and the microscope objective lens 142 to vary, e.g., to be smaller and/or larger, until the image of the fiducial mark is in focus on the imager 108. As discussed herein, the controller 104 may cause the respective position to be varied through control of an actuator 150 that may move the position of the lens array 140 as denoted by the arrow 154 in FIG. 1. For instance, the actuator 150 may move the lens array 140 as part of an autofocus operation. In other examples, the actuator 150 may move the DUT location 152 with respect to the microscope objective lens 142 as denoted by the arrow 162 in FIG. 1.

The controller 104 is to execute the instructions 414 to determine the ROC 206 of the DUT 102 based on an application of a correlation of ROC-dependent optical conjugate positions in the optical components 110 induced by the ROC 206 of the DUT 102 from the determined position of the DUT location 152 with respect to the microscope objective lens 142. Particularly, for instance, the controller 104 may determine the ROC 206 of the DUT 102 using a set of data corresponding to correlations between respective positions of the DUT location with respect to the lens and radii of curvatures. The set of data may be determined through testing of conjugate positions resulting from various combinations of the ROCs and positions of the DUT location 152 with respect to the microscope objective lens 142. The set of data may also correspond to a particular component of the optical components 110 on which the fiducial mark has been provided. Additionally, the controller 104 may have access to a number of sets of data corresponding to additional components of the optical components 110.

According to examples, the controller 104 may determine the ROC 206 of the DUT 102 by comparing the determined position of the DUT location 152 with respect to the microscope objective lens 142 against the set of data. In instances in which the controller 104 does not find an exact match in the set of data, the controller 104 may interpolate the ROC 206 from the set of data. In some examples, the set of data may be stored in the data store 404 such that the controller 104 may readily access the set of data.

In some examples, the controller 104 may, at a first instance, cause the relative position between the DUT location 152 and the microscope objective lens 142 to vary until a surface of the DUT 102 is in focus of the imager 108. The imager 108 may capture an image of the DUT 102 such that the image may be analyzed. In addition, the controller 104 may, at a second instance, cause the relative position between the DUT location 152 and the microscope objective lens 142 to vary until an image of the fiducial mark is in focus of the imager 108. The controller 104 may then determine the ROC 206 of the DUT 102 as discussed herein.

Various manners in which the controller 104 may operate are discussed in greater detail with respect to the method 500 depicted in FIG. 5. Particularly, FIG. 5 illustrates a flow diagram of a method 500 for determining a ROC 206 of a DUT 102, according to an example of the present disclosure. It should be understood that the method 500 may include additional operations and that some of the operations described therein may be removed and/or modified without departing from the scope of the method 500. The description of the method 500 is made with reference to the features depicted in FIGS. 1-4 for purposes of illustration.

At block 502, the controller 104 may cause a relative position between a DUT location 152 at which the DUT 102 is positioned and a microscope objective lens 142 of optical components 110 to vary. As discussed herein, varying the relative position causes conjugate images of a fiducial mark positioned on one of the optical components 110 to be relayed through the optical components 110 and from the DUT 102 to an imager 108 at varying levels of focus. The controller 104 may cause the relative distance to be varied in any of the manners discussed herein.

At block 504, the controller 104 may determine a position of the DUT location 152 with respect to the microscope objective lens 142 at which a conjugate image of the fiducial mark captured by the imager 108 is in focus. In addition, at block 506, the controller 104 may determine the ROC 206 of the DUT 102 based on an application of a correlation of ROC-dependent optical conjugate positions in the optical components 110 induced by the ROC 206 of the DUT 102 from the determined position of the DUT location 152 with respect to the microscope objective lens 142.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A system for determining a radius of curvature (ROC) of a device under test (DUT), the system comprising:
    an illumination source to output a light beam;
    an imager to capture images;
    optical components positioned:
        in an illumination path from the illumination source to a DUT location; and
        in an imaging path from the DUT location to the imager, wherein at least one of the optical components includes a fiducial mark; and
    a controller to:
        cause a relative position between the DUT location and a lens in the optical components to vary and cause conjugate images of the fiducial mark to be relayed through the optical components to the imager; and
        determine the ROC of the DUT based on an application of a correlation of ROC-dependent optical conjugate positions in the optical components induced by the ROC of the DUT.

2. The system of claim 1, wherein the controller is to:
    determine a position of the DUT location with respect to the lens at which a conjugate image of the fiducial mark captured by the imager is in focus; and
    determine the ROC of the DUT based on a defined correlation between the determined position of the DUT location with respect to the lens and the ROC of the DUT.

3. The system of claim 2, wherein the controller is to compare the determined position of the DUT location with respect to the lens against a set of data corresponding to correlations between respective positions of the DUT location and the lens and radii of curvatures.

4. The system of claim 1, wherein the DUT comprises a ferrule and a fiber-optic cable.

5. The system of claim 1, further comprising:
    an actuator to move a lens array in the optical components in an autofocus operation and wherein the controller is to control the actuator to move the lens array to cause an image of the fiducial mark to automatically become focused on the imager.

6. The system of claim 1, further comprising:
    an actuator to move the DUT location with respect to the optical components and wherein the controller is to control the actuator to cause the relative position between the DUT location and the lens to vary.

7. The system of claim 1, further comprising:
    a controller; and
    wherein the controller is to:
        cause the relative position between the DUT location and the lens to vary at a first instance until a surface of the DUT is in focus of the imager; and
        cause the relative position between the DUT location and the lens to vary at a second instance until an image of the fiducial mark is in focus of the imager.

8. The system of claim 1, wherein the optical components comprise a collector lens, a field stop, a mirror, a diffuser, and the lens and wherein the fiducial mark is positioned on one of the optical components.

9. The system of claim 1, wherein the fiducial mark comprises a symbol, a scratch, a letter, and/or a character positioned on a surface of the at least one of the optical components.

10. A test system for determining a radius of curvature (ROC) of a device under test (DUT), the test system comprising:
    a controller; and
    a memory on which is stored machine-readable instructions that when executed by the controller, cause the controller to:
        cause a relative position between a DUT location at which the DUT is positioned and a lens of optical components to vary, wherein varying the relative position causes conjugate images of a fiducial mark positioned on one of the optical components to be relayed through the optical components and from the DUT to an imager at varying levels of focus;

determine a position of the DUT location with respect to the lens at which a conjugate image of the fiducial mark captured by the imager is in focus; and determine the ROC of the DUT based on an application of a correlation of ROC-dependent optical conjugate positions in the optical components induced by the ROC of the DUT from the determined position of the DUT location with respect to the lens.

11. The test system of claim 10, wherein the instructions further cause the controller to:

determine the ROC of the DUT using a set of data corresponding to correlations between respective positions of the DUT location with respect to the lens and radii of curvatures.

12. The test system of claim 10, wherein the instructions further cause the controller to:

control an actuator to cause the relative position between the DUT location and the lens to vary.

13. The test system of claim 12, wherein the actuator is to control movement of a lens array in the optical components and the instructions further cause the controller to control the actuator to move the lens array as part of an autofocus operation.

14. The test system of claim 12, wherein the actuator is to control movement of the DUT location and the instructions further cause the controller to control the actuator to move the DUT location toward and away from the lens.

15. The test system of claim 10, wherein the instructions cause the controller to:

cause the relative position between the DUT location and the lens to vary at a first instance until a surface of the DUT is in focus of the imager; and cause the relative position between the DUT location and the lens to vary at a second instance until an image of the fiducial mark is in focus of the imager.

16. The test system of claim 9, further comprising:

an illumination source to output a light beam through some of the optical components to the DUT location; the optical components; and the imager.

17. A method of determining a radius of curvature (ROC) of a device under test (DUT), the method comprising:

causing, by a controller, a relative position between a DUT location at which the DUT is positioned and a lens of optical components to vary, wherein varying the relative position causes conjugate images of a fiducial mark positioned on one of the optical components to be relayed through the optical components and from the DUT to an imager at varying levels of focus;

determining, by the controller, a position of the DUT location with respect to the lens at which a conjugate image of the fiducial mark captured by the imager is in focus; and determining, by the controller, the ROC of the DUT based on an application of a correlation of ROC-dependent optical conjugate positions in the optical components induced by the ROC of the DUT from the determined position of the DUT location with respect to the lens.

18. The method of claim 17, further comprising:

determining the ROC of the DUT using a set of data corresponding to correlations between respective positions of the DUT location with respect to the lens and radii of curvatures.

19. The method of claim 17, further comprising:

controlling an actuator to move a lens array of the optical components as part of an autofocus operation to cause the relative position of the DUT location and the lens of the optical components to vary.

20. The method of claim 17, further comprising:

controlling an actuator to move the DUT location with respect to the lens of the optical components to cause the relative position of the DUT location and the lens of the optical components to vary.

* * * * *